E. S. CHURCH.
CHECK VALVE.
APPLICATION FILED NOV. 3, 1916.
1,339,101. Patented May 4, 1920.
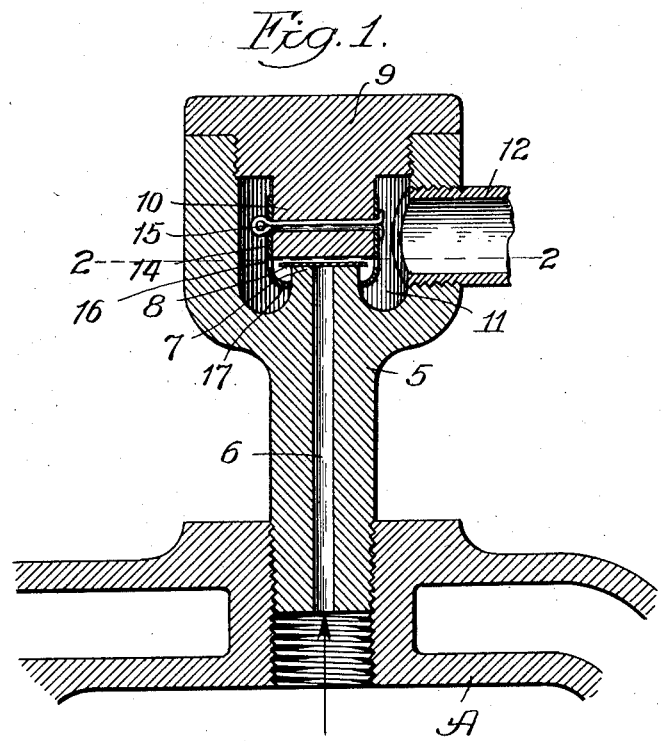
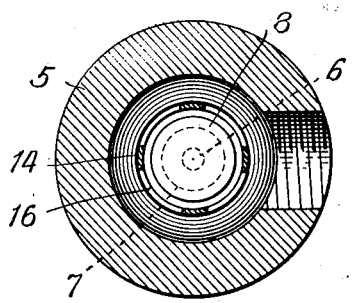
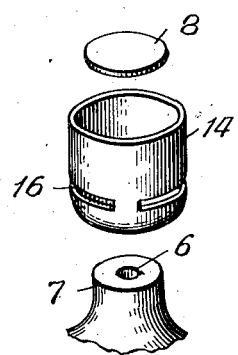
Witness:
John Enders
Inventor:
Edmund S. Church
by Fred Gerlach
his Atty.

UNITED STATES PATENT OFFICE.

EDMUND S. CHURCH, OF CHICAGO, ILLINOIS.

CHECK-VALVE.

1,339,101.  Specification of Letters Patent.  Patented May 4, 1920.

Application filed November 3, 1916. Serial No. 129,267.

*To all whom it may concern:*

Be it known that I, EDMUND S. CHURCH, a citizen of the United States, and a resident of Chicago, in the county of Cook and State of Illinois, have invented certain new and useful Improvements in Check-Valves, of which the following is a full, clear, and exact description.

The invention relates to check valves. In many instances, the noise of a check valve is objectionable, for example, in motor vehicles. While this noise can, in some instances, be overcome by cushioning material, such as leather or rubber, the use of such material is objectionable because it is likely to be deteriorated by the fluid passing through the valve.

One object of the invention is to provide an improved check valve which is substantially noiseless without the use of cushioning means. Another object of the invention is to provide a check valve which is simple in construction and durable and efficient in operation.

The invention consists in the several novel features hereinafter set forth and more particularly defined by claims at the conclusion hereof.

In the drawings: Figure 1 is a section of a check valve embodying the invention. Fig. 2 is a section taken on line 2—2 of Fig. 1. Fig. 3 is a perspective of the disk valve and the guide tube.

The improved check-valve comprises a casing 5 which is illustrated as connected to the working cylinder A of an explosive engine to permit the escape of a small quantity of fluid under pressure from the cylinder for use in a fuel feeding system. Casing 5 is formed with an inlet duct 6 which is in communication with the combustion chamber of the engine and with a valve seat 7 at the upper end of this duct. A thin flat disk 8 of sheet metal serves as a closure or valve which is adapted to close on the seat 7 and prevent back-flow of fluid through the duct 6. A plug 9 is screw-threaded into the casing so that it can be removed. This plug is provided with an integral depending stem 10, the lower end of which is disposed above and in close proximity to the disk 8 to act as a stop for limiting the movement of the thin disk away from the valve seat. A chamber 11 is formed in the casing and an outlet pipe 12 is connected to said chamber.

A tubular guide 14 for the disk is formed of sheet metal and fits around and is removably held on the stem 10 by a cotter pin 15. Openings 16 are formed in the tubular guide for the passage of fluid from the duct 6 to chamber 11 when the valve is open. The lower end of the tubular guide is turned inwardly, as at 17, to underlie the margin of the disk valve so that when the plug 9 is removed from the casing, the disk will be removed with the plug. When the plug is removed, the cotter pin will be accessible and the tubular guide may be disconnected from the stem to permit inspection or replacement of the disk.

A characteristic of the invention is the employment of a very thin disk valve which will be so light in weight that its impact against the seat and against the stem 10 which arrests its upward movement will not result in any audible noise and by thus forming the valve, the use of cushioning material is avoided. Sufficient play is left between the edge of the disk and the tubular guide 14 to permit some lateral play of the disk so that different portions thereof will engage the valve seat. The purpose of this is to prevent the thin metal from being speedily worn by contact of the same area with the valve seat. Another feature of the invention consists in employing a tubular guide which can be formed of sheet metal and is secured to the stem of the plug by a cotter pin to facilitate its removal. The movement of the disk valve between the valve seat and the end of the stem 10 is slight so that it will always be closed against the seat when there is back pressure against it or there is suction in the inlet duct 6.

In the use of the valve in a line through which fluid passes from the cylinder of an explosive engine to a fuel feed, the duct 6 is so small that fire will not pass therethrough and this valve has been found efficient for such use.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a check valve, the combination of a casing having a seat therein and inlet and outlet connections for fluid, a valve consisting of a single thin flat metal disk adapted to fit on the seat and a stop to limit and spaced to permit bodily movement of the disk away from the seat, said disk being so thin and of such light material that it will be noiseless when it is rapidly operated between the seat and the stop.

2. In a check valve, the combination of a casing having a seat therein and inlet and outlet connections for fluid, a thin flat disk adapted to fit on the seat, a plug having a stem in the casing, a sheet metal tube removably held on the stem for guiding the edge of the disk, and a stop on the stem to limit the movement of the disk away from its seat.

3. In a check valve, the combination of a casing having a seat therein and inlet and outlet connections for fluid, a thin flat disk adapted to fit on the seat, a plug having a stem in the casing, a sheet metal tube around the stem for guiding the edge of the disk, a cotter pin for removably connecting the tube to the stem, and a stop-surface on the stem to limit the movement of the valve away from its seat.

4. In a check valve, the combination of a casing having a seat therein and inlet and outlet connections for fluid, a removable plug in the casing having a stem, a thin flat disk valve adapted to fit on the seat, and a tubular guide for the edge of the disk removably held on the stem, having an opening for fluid and provided with means for removing the valve with the plug.

5. In a check valve, the combination of a casing having a seat therein and inlet and outlet connections for fluid, a thin flat disk adapted to fit on the seat, a removable plug in the casing having a stem, a sheet-metal tube around the stem for guiding the edge of the disk, a pin for removably holding the tube on the stem, and a stop-surface on the stem to limit the movement of the valve away from its seat, said tube having openings for fluid therein and an inturned edge to retain the disk with the plug when the plug is removed from the casing.

EDMUND S. CHURCH.